United States Patent [19]

Wallace et al.

[11] Patent Number: 4,752,489

[45] Date of Patent: Jun. 21, 1988

[54] PROCESS OF PACKAGING FRUIT DISPERSED IN A GEL

[75] Inventors: Brendon C. Wallace; Terrence B. Bowring, both of Shepparton, Australia

[73] Assignee: S.P.C. Limited, Shepparton, Australia

[21] Appl. No.: 886,961

[22] Filed: Jul. 9, 1986

[30] Foreign Application Priority Data

Jul. 9, 1985 [AU] Australia ............................ PH 1395

[51] Int. Cl.$^4$ ............................ A23B 7/08; A23L 1/04
[52] U.S. Cl. .................................... 426/401; 426/573; 426/575
[58] Field of Search ......................... 426/401, 573, 575

[56] References Cited

U.S. PATENT DOCUMENTS

| | | | |
|---|---|---|---|
| 2,563,996 | 8/1951 | Edgar | 426/573 |
| 3,445,243 | 5/1969 | Moirano | 426/573 |
| 3,556,810 | 1/1971 | Moirano | 426/573 |
| 3,658,556 | 4/1972 | Klein | 426/573 |
| 4,200,661 | 4/1980 | Brigand et al. | 426/573 |
| 4,264,637 | 4/1981 | Braverman | 426/573 |
| 4,307,124 | 12/1981 | Moirano | 426/573 |

*Primary Examiner*—Raymond N. Jones
*Assistant Examiner*—Mary S. Mims

[57] ABSTRACT

A process is disclosed wherein fruit is dispersed in a gelling agent consisting of locust bean gum and potassium sensitive kappa-carrageenan suspended in acidified water, followed by sealing the fruit and gelling agent in a container, then the container is sterilized and cooled sufficiently to set the gel.

5 Claims, No Drawings

PROCESS OF PACKAGING FRUIT DISPERSED IN A GEL

This invention relates to a packaging process, more particularly, to such a process as it relates to the packaging of fruit in a gel.

Heretofore, fruit has been canned in liquid and one of several normal practices to sterilize the canned product, in order to provide the product with a long shelf life, is to subject the product to a high temperature treatment in a rotary pressure sterilizer at a temperature of say 106° C. for a period of time in a steam atmosphere.

The principle object of the present invention is to provide a process for the production of a packaged product having normal long shelf life comprising fruit well dispersed in a gel and which product is visually and structurally acceptable by being an integral, rigid product free of bubbles, fractures and syneresis when it is removed from the container so that it can be readily sliced into distinct portions.

Unfortunately, the above objective cannot be satisfied by the use of commercially available gum mixtures because the aforementioned necessary sterilization procedure adversely affects the gelling properties of these mixtures, i.e. the high temperature used breaks down the macro-molecular linkages which brings about degenerative conditions in the gel from syneresis to complete structural break down of the gel.

Accordingly, it is a further objective of the invention to provide a process which uses a combination of gums which are not subject to the same degree of degradation experienced by conventional, commercially available gum mixtures as a result of sterilization of the canned product.

Additionally, it is a further objective of the invention to provide a specific order of addition of materials specifically through a high shear blender to produce a gel suspension.

It is yet a further objective of the invention to provide a two stage method of cooling that is intrinsic to the ultimate appearance of the product.

The invention, therefore, according to its broadest aspect, provides a process for packaging fruit dispersed in a gel comprising (1) suspending a food gelling agent selected from the group consisting of locust bean gum, potassium sensitive kappa-carrageenan, agar, salts of alginic acid with sodium, potassium and ammonium, guar gum, xanthan gum and combinations thereof in chemically conditioned water to obtain a stable suspension thereof, (2) adding said suspension of said food gelling agent to said container at a temperature which ensures safe subsequent sterilization of the product and prevents premature setting of said gel, the fruit being added to the container before, during or after the addition of said suspension, (3) sealing said container under vacuum, (4) subjecting said container to heat treatment at a temperature and for a time sufficient to sterilize the content but not such as to impair the integrity of the gel, (5) cooling said container, while maintaining the container in rotation, to a temperature just above the gel setting point, and (6) further cooling said container to ambient temperature while maintaining said container in a condition in which the contents are undisturbed.

Advantageously, the food gelling agent is a combination of locust bean gum and potassium sensitive kappa-carrageenan in a proportion of approximately 2:1 by weight. The above combination of gums is suspended in an acidified medium comprising acids and acid salts, e.g. citric and ascorbic acids and potassium citrate and sodium citrate. These acids and acid salts aid in the suspension process. The water is advantageously cold so as to obviate setting of the gel.

Another preferred food gelling agent is the alginic acid-calcium salt system.

Preferably the above components are subjected to high shear blending and, advantageously, sugar or sugar substitutes, colourings, flavourings and aromas are added to the suspension. The foaming should be kept to a minimum.

Subsequently, the temperature of the suspension is conveniently raised to a temperature in the range of 45° to 85° C. and the suspension is then added to the container. In the case of the locust bean gum/kappa-carrageenan combination of gelling agents, the above temperature is in the range 45° to 50° C.

Advantageously, the sealed container is heated under rotation in a steam medium at a temperature in the range of 100° to 110° C. for a time in the range 12 to 24 minutes.

Preferably, the rotational cooling is such as to ensure that the temperature of the emerging container (skin temperature) is approximately 5° C. above the gel setting point. In the case of the locust bean gum/kappa-carrageenan combination of gelling agents, the temperature range is 53° to 58° C.

Conveniently, the container is then erected, stacked and placed in storage at about −1° to 8° C. to allow cooling under conditions in which the contents are undisturbed.

Alternatively, in lieu of stacking, the containers are either spray cooled or immersed in a cooling medium.

The invention will now be described and illustrated with reference to the following Examples.

EXAMPLE 1

Sliced Peaches in Orange Jelly (825 g. net)

(1) A batch tank equipped with a mixer was filled with running water at ambient temperature.

(2) The mixer was switched on and 340.0 kg. of cane sugar, 600 ml. of orange oil and 200 ml. of orange flavour were added to the batch tank.

(3) The addition of water was stopped when the 1800 liter mark was reached.

(4) The following substances were then added via the high shear blender in the following order: 5.0 kg. sodium citrate and 8.0 kg. potassium citrate, 6.3 kappa-carrageenan, 12.6 kg. locust bean gum, 5.2 kg. anhydrous citric acid and 0.5 kg. ascorbic acid.

(5) 0.12 kg. -carotene 10% and 600 ml. annatto both predissolved in water at 80° C. were then added over the tank rim, followed by 60 liters of valencia orange concentrate.

(6) The batch tank was then topped up to 2,000 liters with water at ambient temperature.

(7) Mixing was continued for a further five minutes and then the pH was checked; the acceptable range is 4.5 to 4.6. If required, adjustments were made with citric acid.
(8) The gel suspension was then pumped to the vacuum can filler via a heat exchanger where the gel suspension temperature was elevated to a temperature in the range 45° C. to 50° C.
(9) The gel suspension was filled in to a 825 g. can already containing 400 to 410 g. of peeled, sliced peach.
(10) The filled can was then closed on a steam-flow vacuum closer. The can was then passed into a rotary sterilizer where it was subjected to heat treatment at 106° C. for 18 minutes.
(11) The can was then passed from the sterilizer to a rotary cooler where the "skin" temperature was reduced to a temperature in the range 58° C. to 53° C.
(12) Having emerged from the rotary cooler, the can was lacquered and stacked in an erect position and then coolstored at −1° to +8° C. for about 24 hours.
(13) The can was then removed to warehouse storage.

EXAMPLE 2

Sliced Peaches in Orange Jelly (825 g. net)

(1) A batch tank equipped with a mixer was filled with running water at ambient temperature.
(2) The mixer was switched on and 472.0 kg. of deionised pear juice concentrate at 72% brix, 600 ml. of orange oil and 200 ml. of orange flavour were added to the batch tank.
(3) The addition of water was stopped when the 1800 liter mark was reached.
(4) The following substances were then added via the high shear blender in the following order: 5.0 kg. sodium citrate and 8.0 kg. potassium citrate, 6.3 kappa-carrageenan, 12.6 kg. locust bean gum, 5.2 kg. anhydrous citric acid and 0.5 kg. ascorbic acid.
(5) 0.12 kg. -carotene 10% and 600 ml. annatto both predissolved in water at 80° C. were then added over the tank rim, followed by 60 liters of valencia orange concentrate.
(6) The batch tank was then topped up to 2,000 liters with water at ambient temperature.
(7) Mixing was continued for a further five minutes and then the pH was checked; the acceptable range is 4.5 to 4.6. If required, adjustments were made with citric acid.
(8) The gel suspension was then pumped to the vacuum can filler via a heat exchanger where the gel suspension temperature was elevated to a temperature in the range 45° C. to 50° C.
(9) The gel suspension was filled into 825 g. already containing 440 to 450 g. of peeled, sliced peach.
(10) The filled can was then closed on a steam-flow vacuum closer. The can was then passed into a rotary sterilizer where it was subjected to heat treatment at 106° C. for 18 minutes.
(11) The can was then passed from the sterilizer to a rotary cooler where the "skin" temperature was reduced to a temperature in the range 58° C. to 53° C.
(12) Having emerged from the rotary cooler, the can was lacquered and stacked in an erect position and then coolstored at −1° to +8° C. for about 24 hours.
(13) The can was then removed to warehouse storage.

EXAMPLE 3

Quarter Pears in Passionfruit Jelly (825 g. net)

(1) As in step 1, Example 1.
(2) 360.0 kg. cane sugar and 2.4 liters passionfruit flavour was used only.
(3) As in step 3, Example 1.
(4) 2.4 kg. sodium citrate and (as in Example 1) 8.0 kg. potassium citrate were added followed by 8.3 kg. kappa-carrageenan, 15.1 kg. locust bean gum, 3.6 kg. anhydrous citric acid, and 1.0 kg. ascorbic acid.
(5) 0.6 kg. -carotene 1% only was predissolved and then 100 liters of passionfruit juice were added.
(6) to (8) As in steps (6) to (8) in Example 1.
(9) As in step 9, Example 1, except that quarter pears (a count of 14 to 16) were used.
(10) As in step 10 of Example 1, however, sterilization takes place at 108° C. for 24 minutes.
(11) to (13) As in steps (11) to (13) of Example 1.

EXAMPLE 4

Sliced Peaches and/or Pineapple Pieces in Mango Jelly (1) As in step 1, Example 1.
(2) 370 kg. of cane sugar, 5 liters of mango pulp and 4.75 liters of mango flavour were added to the batch.
(3) As in step 3, Example 1.
(4) As in Example 1, sodium citrate (6.0 kg), potassium citrate (8.0 kg), kappa-carrageenan (6.3 kg), locust bean gum (12.6 kg), and citric acid (3.0 kg) were added with ascorbic acid (1 kg).
(5) As in step 5, B-carotene 10% (0.12 kg) and annatto (600 ml) were predissolved and added over the tank rim.
(6) Batch was topped up to 2,000 liters with water at ambient temperature.
(7) Steps 7 and 8 of Example 1 were followed.
(8) Gel suspension was filled into 825 g cans already containing 145 g–150 g pre-processed pineapple pieces and 285 g–295 g peach slices.
(9) Steps 10 to 13 as in Example 1 were then applied.

EXAMPLE 5

As for Example 4 with substitution of Fresh Pineapple for pre-processed.

EXAMPLE 6

Sliced Peaches in Orange Jelly (825 g. net)

(1) A batch tank equipped with mixer was filled with running water at ambient temperature.
(2) With the mixer switched on, 340 kg of cane sugar, 600 ml of orange oil and 200 ml of orange flavours were added to the batch tank.
(3) Water addition was stopped at the 1800 liter mark.
(4) Using a high shear mixer, the following substances were then added to the batch: 5.0 kg sodium citrate, 4.0 kg anhydrous citric acid, 16.0 kg sodium alginate, 0.5 kg ascorbic acid and 0.4 kg calgon. Other ingredients as in step 5 of Example 1.
(5) The batch was then topped up to 2000 liters and stirring continued for a minimum of 5 minutes.
(6) The pH of the batch was checked with a desired range of 4.20 to 4.30, adjustments being made with sodium citrate or citric acid as required.
(7) The gel suspension was then pumped to the vacuum can filler via a heat exchanger where the gel suspension was heated to a temperature in the range 45° C. to 50° C.
(8) A second batch tank equipped with a stirrer was filled with water at ambient temperature. 15 kg calcium citrate was dissolved into the water and final volume made up to 500 liters.

(9) Utilising a suitably controlled dosing pump, the calcium citrate solution was pumped into an in-line mixing head which was situated just before the discharge point of the gel-mix to the syruper. Citrate solution was maintained under constant agitation to ensure even dosing.

(10) The combined gel-mix was filled into 825 g cans which had previously been filled with 440–450 g of sliced peaches.

(11) Further handling including processing and cooling was carried out as previously described in steps 10–13 of Example 1.

The claims defining the invention are as follows:

1. A process for packaging fruit dispersed in a gel in a container comprising:
   a. suspending as a food gelling agent a combination consisting of locust bean gum and potassium sensitive kappa-carrageenan in a proportion of locust bean gum to kappa-carrageenan of approximately 2:1 by weight in water acidified with acids or acid salts to a pH of about 4.5 to 4.6 to obtain a stable suspension,
   b. adding said suspension of said food gelling agent to said container at a temperature which ensures safe subsequent sterilization of the product and prevents premature setting of said gelling agent, the fruit being added to the container before, during or after the addition of said suspension,
   c. sealing said container under vacuum,
   d. subjecting said container to heat treatment at a temperature and for a time sufficient to sterilize the content but not such as to impair the integrity of the gel formed by setting the gelling agent,
   e. cooling said container, while maintaining the container in rotation, to a temperature just above the setting point of the gelling agent, and
   f. further cooling said container to ambient temperature while maintaining said container in a condition in which the contents are undisturbed to set the gel.

2. The process as claimed in claim 1, wherein the suspension of food gelling agent is added to said container at a temperature in the range of 45° to 50° C.

3. A process as claimed in claims 1 or 2 wherein the sealed container is heated under rotation in a steam medium at a temperature in the range of 100° to 110° C. for a time in the range 12 to 24 minutes.

4. The process as claimed in claims 1 or 2 wherein the rotational cooling is such as to ensure that the temperature of the container (skin temperature) is reduced to approximately 5° C. above the setting point of the gelling agent being a temperature in the range 53°–58° C.

5. A process as claimed in claims 1 or 2 wherein the container, after the rotational cooling, is erected, stacked and placed in storage at about −1° to +8° C. to allow cooling under conditions in which the contents are undisturbed.

* * * * *